(12) United States Patent
Stark et al.

(10) Patent No.: US 6,794,477 B2
(45) Date of Patent: Sep. 21, 2004

(54) SILANE-MODIFIED POLYVINYL ACETALS

(75) Inventors: Kurt Stark, Bughkirchen (DE);
Bernhard Glaser, Woerth (DE);
Christian Hoegl, Reut (DE);
Karl-Heinz Eichel, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 10/217,372

(22) Filed: Aug. 13, 2002

(65) Prior Publication Data

US 2003/0044611 A1 Mar. 6, 2003

(30) Foreign Application Priority Data

Aug. 16, 2001 (DE) .......................................... 101 40 131

(51) Int. Cl.⁷ .............................................. C08G 77/20
(52) U.S. Cl. ........................ 528/32; 526/279; 524/588; 428/446
(58) Field of Search ........................... 528/32; 526/279; 524/588; 428/446

(56) References Cited

U.S. PATENT DOCUMENTS 4,663,228 A 5/1987 Bolton et al.

FOREIGN PATENT DOCUMENTS

| DE | 196 41 064 A1 | 4/1998 |
|---|---|---|
| EP | 0 346 768 A2 | 12/1989 |
| EP | 0 368 832 A2 | 5/1990 |
| EP | 0 461 399 A2 | 12/1991 |
| EP | 0 634 447 A1 | 1/1995 |
| EP | 1 055 686 A1 | 11/2000 |
| EP | 0 636 471 A1 | 3/2001 |
| JP | 5248247 | 9/1994 |
| JP | 6247760 | 9/1994 |
| JP | 10237259 | 9/1998 |

OTHER PUBLICATIONS

Derwent Abstract Corresponding To EP 634447 [AN 1995–(45:45].
Derwent Abstract Corresponding To EP 1055686 [AN 2000–193991].
Derwent Abstract Corresponding To DE 19641064 [AN 1998–Z18:81].
Derwent Abstract Corresponding To JP 06–247760 [AN 1994–322007].
Derwent Abstract Corresponding To JP 06–248247 [AN 1994–322402].
Derwent Abstract Corresponding To JP 10–237259 [AN 1998–537617].
Hochmolekularbericht 1966, H. 4774,66 plus English translation.
Derwent Abstract No. 94–322388/40 Corresponding to JP–A 06–248228.
Derwent Abstract No. 94–322402 40 Corresponding to JP–A 06–248247.
Derwent Abstract No. 98–587617 46 Corresponding to JP–A 10–237259.
Derwent Abstract No. 91–239858 33 Corresponding to EP–A 441276.
Derwent Abstract No. 84–269481 42 Corresponding to US–A 4, 476,172.

*Primary Examiner*—Kuo-Liang Peng
(74) *Attorney, Agent, or Firm*—Brooks Kushman P.C.

(57) ABSTRACT

Silane-modified polyvinyl acetals are obtained by copolymerizing a) vinyl esters of $C_{1-15}$ alkylcarboxylic acids having from 1 to 15 carbon atoms, and optionally (meth) acrylates $C_{1-15}$ of alcohols, olefins, dienes, vinylaromatics, or vinyl halides, with b) from 0.02 to 20.0 % by weight of an ethylenically unsaturated, hydrolyzable silicon compounds or hydrolyzable mercaptosilanes; hydrolyzing the resulting vinyl ester copolymers to 50 mol % or more of vinyl alcohol units; and acetalizing vinyl alcohol units with a $C_{1-15}$ aliphatic or aromatic aldehydes, wherein from 5 to 50 % by weight of a mixture of comonomers a) and silane comonomers b), based on the total weight of comonomers a) and b), is used as an initial charge, and the remainder is metered in during polymerization, such that the ratio between the comonomers a) and silane comonomers b) remains constant throughout the polymerization, resulting in a homogeneous polymer.

8 Claims, No Drawings

SILANE-MODIFIED POLYVINYL ACETALS

BACKGROUND OF THE INVENTION

1. Field of the Invention

The invention relates to silane-modified polyvinyl acetals, to a process for their preparation, and to their use.

2. Background Art

The preparation of polyvinyl acetals, obtained from the corresponding polyvinyl alcohols by polymer-analogous reaction with appropriate aldehydes, was disclosed as early as 1924, and since then a wide variety of aldehydes has been used for preparing the corresponding polyvinyl acetals. Polyvinyl acetals are prepared in a 3-stage process, wherein polyvinyl acetate is hydrolyzed to polyvinyl alcohol which is then converted to polyvinyl acetal. The resultant products contain vinyl alcohol units and vinyl acetate units, as well as vinyl acetal groups. Polyvinyl formal, polyvinyl acetacetal, and polyvinyl butyral (PVB) have achieved particular commercial importance. The term "modified polyvinyl acetals" hereinafter means polyvinyl acetals which contain other monomer units in addition to vinyl acetate, vinyl alcohol, and vinyl acetal units.

The largest application sector for polyvinyl acetals is the production of safety glass in automotive construction and for architectural uses. For example, plasticized polyvinyl butyral films are used as an intermediate layer in glazing units. Mixtures containing modified polyvinyl butyrals have also been proposed for this purpose, for example those having the acetal units described in EP-A 368832 with sulfonate, carboxylate, or phosphate functionality, which feature improved blocking and flow performance. EP-A 634447 discloses modified polyvinyl butyrals whose main polymer chain contains monomer units which bear sulfonate groups, these polyvinyl butyrals being obtainable via acetalization of the corresponding sulfonate-functional polyvinyl alcohols.

EP-A 461399 discloses polyvinyl butyrals modified with amino groups, used as precipitants. Another application sector for polyvinyl butyrals is their use in anti-corrosion coatings, as is disclosed in EP-A 1055686, for example, where polyvinyl acetals modified with tertiary alkanolamines are employed for this purpose.

Polyvinyl butyrals are also used as binders in paints, and specifically, in printing inks, due principally to their good pigment binding power. One of the requirements of such applications is that organic solutions of the polyvinyl butyrals should have very low solution viscosity, in order to permit their use for producing inks with high solids content, while employing a very high binder content as well. Modified polyvinyl butyrals disclosed in DE-A 19641064 which exhibit low solution viscosity are examples here, and are obtained by acetalizing a copolymer having vinyl alcohol units and 1-alkylvinyl alcohol units.

A disadvantage possessed by all of the polyvinyl acetals described in the prior art is their inadequate adhesion to specific substrates. For this reason, addition of coupling agents is essential in many cases. EP-B 0346768 describes the coating of films or foils with amino-functional silanes, such as N-(2-aminoethyl)-3-aminopropyltrimethoxysilane, in order to improve bonding to other polymers, in particular polyvinyl butyrals. Polyethylene films and polyester films are coated either with vinyltrimethoxysilanes or with chloropropyltri-methoxysilanes in order to improve adhesion, thus providing successful lamination using hot-melt adhesives based on ethylene-vinyl acetate copolymers (E. Plueddemann, "Bonding through Coupling Agents", Plenum Press, New York, 1985). N-2-aminoethyl-3-aminopropyltrimethoxysilane has been employed as a primer coat for improving the adhesion of ionic resins, for example salts of a polymer based on ethylene-methacrylic acid, to glass or polycarbonate films (U.S. Pat. No. 4,663, 228). EP-B 0636471 claims a process for producing a glass composite, where the adhesion between glass and polymer film, inter alia polyvinyl butyral, is improved by using a mixture of at least two silanes, one which increases the bond strength between glass and polymer film, while a second silane does not provide bonding between glass and polymer film.

The processes described in the prior art for improving adhesion between polyvinyl acetals and critical substrates by adding known coupling agents have clear disadvantages. For example, the adhesion-promoting action is often not sufficiently long-lasting, or the composite weakens over time. Another disadvantage is the yellowing of aminosilanes, their unpleasant odor, and skin-irritant action, known problems when using amino-functional compounds. Another problem involves the actual addition of the coupling agent, which always requires an additional time-consuming step in the mixing procedure. The selection and addition of suitable coupling agents, furthermore, requires great expertise, since when adhesion promoters are added to polyvinyl acetal in organic solvent, the result can at times be incompatibility and inhomogeneity, extending as far as phase separation. In addition, the reactive silanes subsequently added as coupling agent may become involved in side reactions such as hydrolysis or condensation reactions. A further disadvantage consists in the large amount of adhesion promoter which generally is required in order to achieve noticeably improved adhesion of polyvinyl acetals on critical substrates. As a result, the process can therefore become very expensive, since the price of silanes is high.

Three Japanese publications have disclosed silane-modified polyvinyl acetals. JP-A 06-247760 and JP-A 06-248247 disclose polyvinyl acetals modified with silane-functional monomer units which are used as binders for cementitious compositions or for inorganic fiber materials. These Si-modified polyvinyl acetals are obtained by copolymerizing vinyl acetate with vinylalkoxysilanes, hydrolyzing the vinyl ester-vinylsilane copolymers, and then acetalizing with aldehydes. JP-A 10-237259 discloses a mixture of silane-modified polyvinyl acetal with unmodified polyvinyl acetal for coating materials to be printed using inkjet printers. In the latter reference, vinylester-vinyl-silane copolymers are first hydrolyzed and then mixed with unmodified polyvinyl alcohol for acetalizing with aldehyde. A disadvantage with the procedures found in all these publications is that they always result an polymer in which pure polyvinyl acetal chains are present alongside polyvinyl acetal chains modified with silanol groups, which is the source of the incompatibility. The enrichment of silanol groups in the silane-modified polyvinyl acetal chains also increases the extent of undesired condensation, and thus results in gelling. Only strongly alkaline systems, e.g. cementitious compositions, are capable of breaking down this gel to some extent, but in neutral organic solvents the inhomogeneity and the gel continue to be present, the visible result being marked phase separation, which is disadvantageous.

SUMMARY OF THE INVENTION

It was an object of the invention to provide polyvinyl acetals which, even without addition of other materials, exhibit very good adhesion to various substrates, and in particular to the known critical substrates, so that it is possible for the addition of adhesion promoters to be omitted entirely. Surprisingly, it has been found that polyvinyl acetals which are prepared in the manner of the invention, by hydrolyzing and acetalizing polymers containing uniformly distributed vinyl ester and alkoxysilane units prepared by polymerization of vinyl ester and silane monomer wherein the proportions of these monomers are maintained substantially constant during the polymerization (hereinafter termed "silanized solid resins"), have markedly improved adhesion to critical substrates, indeed to the extent that adhesion promoters can be omitted.

DETAILED DESCRIPTION OF THE PREFERRED EMBODIMENT(S)

The invention provides silane-modified polyvinyl acetals obtained by copolymerizing a) one or more monomers selected from the group consisting of vinyl esters of unbranched or branched ("optionally branched") alkylcarboxylic acids having from 1 to 15 carbon atoms, and where appropriate, one or more methacrylates and/or acrylates ("(meth)acrylates") of alcohols having from 1 to 15 carbon atoms, olefins, dienes, vinylaromatics, and vinyl halides as additional comonomers, with b) from 0.02 to 20.0% by weight of one or more hydrolyzable silane compounds selected from the group consisting of ethylenically unsaturated, hydrolyzable silicon compounds and hydrolyzable mercaptosilanes, then hydrolyzing the vinyl ester copolymers as to provide a 50 mol % or greater content of vinyl alcohol units, followed by acetalizing the vinyl alcohol units with one or more aldehydes selected from the group consisting of aliphatic and aromatic aldehydes having from 1 to 15 carbon atoms, wherein from 5 to 50% by weight of a mixture made from the comonomers a) and from the silane comonomers b), based on the total weight of the comonomers a) and b), is used as an initial charge in the polymerization, and the remainder of the mixture is metered in during the polymerization, so that the ratio between the comonomers a) and the silane comonomers b) remains relatively constant throughout the polymerization, resulting in a homogeneous polymer. In the claims, by the term "constant" is meant "relatively constant" such that silane monomer-derived units are distributed throughout the product polymer.

It is preferable to copolymerize from 50 to 99.98% by weight of vinyl esters a), based on the total weight of the comonomers. Suitable vinyl esters include vinyl esters of optionally branched carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 5 to 11 carbon atoms, such as VeoVa9$^R$ or VeoVa10$^R$ (tradenames of Shell). Vinyl acetate is particularly preferred.

Suitable (meth)acrylate comonomers include esters of optionally branched alcohols having from 1 to 15 carbon atoms. Preferred (meth)acrylates are methyl acrylate, methyl methacrylate, ethyl acrylate, ethyl methacrylate, propyl acrylate, propyl methacrylate, n-, iso-, and tert-butyl acrylate, n-, iso- and tert-butyl methacrylate, 2-ethylhexyl acrylate, and norbornyl acrylate. Particular preference is given to methyl acrylate, methyl methacrylate, n-, iso-, and tert-butyl acrylate, 2-ethylhexyl acrylate, and norbornyl acrylate. Suitable dienes include 1,3-butadiene and isoprene. Examples of polymerizable olefins include ethene and propene. The vinyl aromatics which may be incorporated in the polymer include styrene and vinyltoluene. The vinyl halide comonomers are preferably vinyl chloride, vinylidene chloride, or vinyl fluoride, more preferably vinyl chloride. No additional comonomer, a single additional comonomer, or mixtures of additional comonomers may be used. The proportion of these comonomers is such that the proportion of vinyl ester monomer in the vinyl ester copolymer is 50 mol % or more.

Where appropriate, the comonomers a) may also comprise from 0.02 to 20% by weight, based on the total weight of the comonomers a) and b), of other comonomers. Examples of these are ethylenically unsaturated mono- and dicarboxylic acids, preferably acrylic acid, methacrylic acid, fumaric acid, or maleic acid; ethylenically unsaturated carboxamides and ethylenically unsaturated carbonitriles, preferably N-vinylformamide, acrylamide, or acrylonitrile; mono- and diesters of fumaric acid or maleic acid such as their diethyl or diisopropyl esters, and also maleic anhydride; and ethylenically unsaturated sulfonic acids and their salts, preferably vinylsulfonic acid or 2-acrylamido-2-methylpropanesulfonic acid. Other examples include precrosslinking comonomers, such as ethylenically polyunsaturated comonomers, e.g. divinyl adipate, diallyl maleate, allyl methacrylate, butanediol diacrylate, or triallyl cyanurate, or post-crosslinking comonomers, such as acrylamidoglycolic acid (AGA), methyl methylacrylamidoglycolate (MAGME), N-methylolacrylamide (NMA), N-methylolmethacrylamide, allyl N-methylolcarbamate, alkyl ethers or esters of N-methylolacrylamide, of N-methylolmethacrylamide, or of allyl N-methylolcarbamate, such as their isobutoxy ethers.

Examples of suitable silane comonomers b) are ethylenically unsaturated silicon compounds of the general formula $R^1SiR_{0-2}(OR^2)_{1-3}$, where R is a $C_1$–$C_3$-alkyl radical, a $C_1$–$C_3$-alkoxy radical, or halogen, such as Cl or Br, $R^1$ is $CH_2$=$CR^3$—$(CH_2)_{0-1}$ or $CH_2$=$CR^3CO_2(CH_2)_{1-3}$, $R^2$ is an unbranched or branched ("optionally branched"), unsubstituted or substituted ("optionally substituted") alkyl radical having from 1 to 12 carbon atoms, preferably from 1 to 3 carbon atoms, or an acyl radical having from 2 to 12 carbon atoms, and, where appropriate, the carbon atoms of $R^2$ may be interrupted by an ether group, and $R^3$ is H or $CH_3$. Preference is given to γ-acryl- and γ-methacryl-oxypropyltri(alkoxy)silanes, α-methacryloxymethyltri(alkoxy)silanes, α-methacryl-oxymethyltri(alkoxy)methylsilanes, α-methacryloxymethylalkoxydi-methylsilanes, γ-methacryloxypropylmethyldi(alkoxy)silanes, γ-methacryl-oxypropyldimethyl(alkoxy)silanes, vinylalkyldi(alkoxy)silanes, vinyldi(alkyl)alkoxysilanes and vinyl-tri(alkoxy)silanes, where examples of alkoxy groups which may be used are methoxy, ethoxy, methoxyethylene, ethoxyethylene, methoxypropylene glycol ether and ethoxypropylene glycol ether radicals. Particular preference is given to vinyltrimethoxysilane, vinyltriethoxysilane, vinyltripropoxysilane, vinyltriisopropoxysilane, vinyltris(1-methoxyisopropoxy)silane, vinyltributoxysilane, vinyltriacetoxysilane, 3-methacryloxypropyltrimethoxysilane, 3-methacryloxypropylmethyldimethoxysilane, methacryloxymethyltrimethoxysilane, 3-methacryloxypropyltris(2-methoxyethoxy)silane, vinyltrichlorosilane, vinylmethyldichlorosilane, vinyltris(2-methoxyethoxy)silane, and trisacetoxyvinylsilane.

Other suitable silane compounds b) are hydrolyzable silicon compounds which exhibit chain-transfer and regulator effect. Particularly suitable silane compounds b) therefore include mercaptosilanes of the general formula HS—

$(CR^4{}_2)_{1-3}$—$SiR^5{}_3$, where $R^4$ are identical or different and are H or a $C_1$–$C_6$-alkyl group, $R^5$ are identical or different and are a $C_1$–$C_6$-alkyl group or a $C_1$–$C_6$-alkoxy group, and at least one of the radicals $R^5$ is an alkoxy group. Preference is given to 3-mercaptopropyltriethoxysilane, 3-mercaptopropyltrimethoxysilane, and 3-mercaptopropylmethyldimethoxysilane.

The most preferred silane compounds b) are vinyltrimethoxysilane, vinyldimethoxymethylsilane, vinylmethoxydimethylsilane, vinyltriethoxysilane, vinyldiethoxymethylsilane, vinylethoxydimethylsilane, vinyltris(1-methoxyisopropoxy)silane, methacryloxypropyltris(2-methoxyethoxy)silane, 3-mercaptopropyltrimethoxysilane, 3-mercaptopropyldimethoxymethylsilane, 3-mercaptopropylmethoxydimethylsilane, 3-methacryloxypropyltrimethoxysilane, 3-methacryloxypropylmethyldimethoxysilane and methacryloxy-methyltrimethoxysilane, and also mixtures of these, in particular mixtures of 2 or more silanes selected from the group consisting of vinyltrimethoxysilane, vinyldimethoxymethylsilane, vinylmethoxydimethylsilane, vinyltriethoxysilane, vinyldiethoxymethylsilane, vinylethoxydimethylsilane, 3-mercaptopropyltrimethoxysilane, 3-methacryloxypropyltrimethoxysilane. The proportion of silane comonomers b) is from 0.02 to 20% by weight, preferably from 0.05 to 3% by weight, particularly preferably from 0.05 to 2% by weight, most preferably from 0.1 to 1.8% by weight, based in each case on the total weight of the comonomers a) and b). In the structural formulae of the organosilicon compounds herein, the subscripts of the various silicon-bound moieties add up to 4 for each silicon atom.

The polymerization takes place in a known manner, preferably by bulk polymerization, suspension polymerization, or polymerization in organic solvents, most preferably in alcoholic solution. Examples of suitable solvents, which may also be regulators, are methanol, ethanol, propanol, isopropanol. The polymerization is carried out at reflux at a temperature of from 55 to 100° C., and is initiated by adding a free-radical initiators as commonly used. Examples of commonly used initiators are percarbonates such as cyclohexyl peroxydicarbonate, and peresters such as tert-butyl perneodecanoate or tert-butyl perpivalate. The molecular weight may be adjusted in a known manner via addition of regulator, via the solvent content, by variation of the initiator concentration, and by variation of the temperature.

From 5 to 25% by weight of a mixture made from the comonomers a) and from the silane comonomers b), based on the total weight of the comonomers a) and b), is preferably used as an initial charge, and the remainder of the mixture is preferably metered in during the polymerization in such a way that the ratio between the comonomers a) and the silane comonomers b) remains approximately constant throughout the polymerization, resulting in a homogeneous polymer. In another preferred embodiment, portions of mixtures made from two or more silane comonomers b) with the comonomers a) are used as an initial charge, and the remainder is metered in. After conclusion of the polymerization, the solvent is distilled off, as are, when appropriate, any excess monomer and/or regulator.

The silanized copolymers are hydrolyzed in a manner known per se to yield silane-containing polyvinyl alcohols, for example by the belt process or kneader process, in an alkaline or acidic medium, with addition of acid or base. It is preferable for the silanized solid resin to be taken up in alcohol, e.g. methanol, the solids content being adjusted to 15–70% by weight. The hydrolysis is preferably carried out in a basic medium, for example by adding NaOH, KOH, or $NaOCH_3$. The amount of base used is generally from 1 to 5 mol % per mole of ester units. The hydrolysis may advantageously be carried out at temperatures of from 30 to 70° C. Once the hydrolysis has ended, the solvent is distilled off, and the polyvinyl alcohol is obtained as a powder. However, it is also possible for the silane-containing polyvinyl alcohol to be obtained as an aqueous solution by successive addition of water during removal of the solvent by distillation.

The partially or fully hydrolyzed, silanized vinyl ester polymers preferably have a degree of hydrolysis of from 50 to 99.99 mol percent, more preferably from 70 to 99 mol percent, and most preferably 96 mol percent or more. The polymers termed "fully hydrolyzed" are those whose degree of hydrolysis is 96 mol percent or more. "Partially hydrolyzed" polyvinyl alcohols are those whose degree of hydrolysis is 50 mol % or more, but less than 96 mol %.

Preference is given to partially or fully hydrolyzed vinyl ester polymers which contain, besides vinyl acetate and vinyl alcohol, vinyltrimethoxysilane, vinyltriethoxysilane, or 3-mercaptopropyltrimethoxysilane. Particular preference is also given to a combination of vinyltrimethoxysilane or vinyltriethoxysilane with 3-mercaptopropyltrimethoxysilane. The viscosity of the silane-containing polyvinyl alcohol (DIN 53015, Höppler method; 4% by weight solution in water) is from 1 to 30 mPas, preferably from 1 to 6 mPas, and serves as a measure of molecular weight and of the degree of polymerization of the partially or fully hydrolyzed, silanized vinyl ester polymers.

For the acetalization, the partially or fully hydrolyzed polyvinyl acetates having alkoxysilane groups and/or having free silanol groups are preferably taken up in an aqueous medium. The solids content of the aqueous solution is usually adjusted to 5–30% by weight. The acetalization takes place in the presence of an acidic catalyst such as hydrochloric acid, sulfuric acid, nitric acid, or phosphoric acid. The pH of the solution is preferably adjusted to values less than 1 by adding 20% by weight hydrochloric acid. After addition of the catalyst, the solution is cooled, preferably to −10–+30° C., depending on the product molecular weight. In general, the lower the molecular weight of the silane-modified polyvinyl alcohol used, the lower the selected precipitation temperature. The acetalization reaction is initiated by adding the aldehyde(s).

Preferred aldehydes include aliphatic aldehydes having from 1 to 15 carbon atoms, for example formaldehyde, acetaldehyde, or propionaldehyde, and most preferably butyraldehyde or a mixture of butyraldehyde and acetaldehyde. Examples of aromatic aldehydes which may be used are benzaldehyde or its derivatives. The amount of aldehyde added depends on the desired degree of acetalization. Since the acetalization proceeds with almost complete conversion, the amount for addition may be determined by simple stoichiometric calculation. Once addition of the aldehyde has been completed, the acetalization is completed by heating the mixture to 20–60° C. and stirring for some time, preferably from 1 to 6 hours, and the pulverulent reaction product is isolated and purified by filtration and then washing. Alkalis may also be added for stabilization. During the precipitation and the post-treatment, the operation may use emulsifiers in order to stabilize the aqueous suspension of the silane-containing polyvinyl acetal.

Aqueous suspensions of the silane-modified polyvinyl acetal may be stabilized using anionic, zwitterionic, cationic, or non-ionic emulsifiers, or protective colloids. It is preferable to use zwitterionic or anionic emulsifiers, where appropriate as mixtures. Preferred non-ionic emulsifiers used include condensation products of ethylene oxide or propylene oxide with linear or branched alcohols having from 8 to 18 carbon atoms or with alkylphenols, or with linear or branched carboxylic acids having from 8 to 18 carbon atoms. Block copolymers of ethylene oxide and propylene oxide may also be used. Examples of suitable anionic emulsifiers include alkyl sulfates, alkylsulfonates, alkyl aryl sulfates, and sulfates or phosphates of condensation products of ethylene oxide with linear or branched alkyl alcohols or with alkylphenols, with from 2 to 25 EO units, and mono- or diesters of sulfosuccinic acid. Examples of suitable zwitterionic emulsifiers include alkyldimethylamine oxides, the alkyl chain preferably having from 6 to 16 carbon atoms. Examples of cationic emulsifiers which may be used include tetraalkylammonium halides such as $C_6$–$C_{16}$-alkyltrimethylammonium bromide. It is also possible to use trialkylamines having one relatively long (5 carbon atoms or more) and two relatively short hydrocarbon radicals (less than 5 carbon atoms), these being present in protonated form during the course of the acetalization, which proceeds under strongly acidic conditions, and being capable of acting as emulsifiers. The amount of emulsifier is from 0.01 to 20% by weight, based on the total weight of the silane-modified polyvinyl acetal in the original solution. Preference is given to amounts of from 0.01 to 2% by weight of emulsifier, and a most preferred amount of emulsifier is from 0.01 to 1% by weight, based on the silane-modified polyvinyl acetal.

The silane-modified polyvinyl acetals have a degree of acetalization of from 1 to 80 mol %, preferably from 45 to 80 mol %. The viscosity of the silane-modified polyvinyl acetals (DIN 53015; Höppler method, 10% by weight solution in ethanol) is from 4 to 1200 mPas, preferably from 4 to 60 mPas. The degree of polymerization is preferably at least 130. The ethanolic solutions of the silane-modified polyvinyl acetal may be converted into a gel, whose degree of development depends on the silane content, with a viscosity markedly greater than 1200 mPas by controlled crosslinking of the silanol groups using crosslinking catalysts known to the skilled worker.

The most preferred silane-modified polyvinyl acetals have a degree of acetalization of from 45 to 80 mol % and a silane content of from 0.1 to 1.8% by weight, or a degree of acetalization of from 45 to 80 mol % and a silane content of from 1.0 to 20% by weight. The latter are suitable, due to their high content of free silanol groups, as crosslinkable polyvinyl acetals, in combination with the crosslinking catalysts usual for silanol groups. Particular preference is also given to polyvinyl acetals which contain carboxy-functional and/or sulfonate-functional comonomer units, in addition to the vinyl alcohol units, silane units, and acetal units, each in the abovementioned amounts.

The process of the invention gives access to modified polyvinyl acetals which have markedly better adhesion to critical substrates than previously known polyvinyl acetals, making it possible to omit addition of any coupling agent. Adhesion to metal and to glass is in particular markedly improved. This adhesion-improvement effect in the polyvinyl acetals becomes apparent even at a very low content of silane groups. In addition, aqueous solutions of these copolymeric polyvinyl alcohols which bear alkoxysilane groups and/or free silanol groups along the chain are markedly more stable at room temperature than solutions of unmodified polyvinyl alcohols. For example, the aqueous solutions of modified polyvinyl alcohols prepared from silanized solid resins whose content of silane-functional comonomer units is from 0.1 to 1.8% by weight can be stored for an unlimited period at room temperature, i.e. do not exhibit the thickening characteristic of relatively highly hydrolyzed polyvinyl alcohols encountered with unmodified polyvinyl alcohols. Another remarkable and surprising fact is that the aqueous neutral solutions of the silane-containing polyvinyl alcohols prepared from the silanized solid resins with from 0.1 to 1.8% by weight content of silane-functional comonomer units exhibit no significant rise in viscosity through condensation of the free silanol groups.

As mentioned at the outset, there is a particular requirement in the printing ink industry for binders with very good adhesion to various flexible polymeric films for use in printing inks which, once applied, have very firm bonding to the substrate and are therefore very difficult to remove from the printed substrate. The excellent adhesion of the silane-modified polyvinyl acetals, in particular polyvinyl butyrals or mixed polyvinyl acetals, makes these particularly suitable for use in printing ink compositions.

Suitable printing ink formulations are known to the skilled worker, and generally comprise from 5 to 20% by weight of pigment, such as diazo pigments or phthalocyanine pigments, from 5 to 15% by weight of polyvinyl acetal binder, and solvent, for example alcohols such as ethanol, or esters such as ethyl acetate. Where appropriate, other additives may also be present, such as inhibitors, plasticizers, and other added materials, such as fillers or waxes. The use of coupling agents is not now required when the silane-modified polyvinyl alcohols of the subject invention are employed.

The silane-modified polyacetals also are highly suitable for laminated safety glass and glass composites, and high-performance safety glass and glazing films, since it is possible to achieve higher tensile stress at break as well as a further improvement in adhesion to glass. In these applications, use of other polymer films, such as PET films, is also to be recommended, since the silane-modified polyvinyl acetals and the films produced from them have very good adhesion not only to the glass surface but also to the surface of these other polymer films, making it unnecessary to add coupling agents. The surface roughness may also be adjusted to a desired level by varying the silane content and, where appropriate, crosslinking the silanol groups.

Water-soluble, partially acetalized silane-containing polyvinyl acetals, which may also contain ionic groups such as carboxylate groups or sulfonate groups, may also be used as a protective colloid, for example for aqueous dispersions, during polymerization in an aqueous medium, or during the production of water-redispersible dispersion powders. Preference is given to silane-containing and water-soluble polyvinyl acetals having a solubility more than 10 g/l in water under standard conditions of temperature and pressure, with a degree of acetalization of from 1 to 20 mol %, in particular from 3 to 16 mol %. In the case of dispersions intended for coatings based on polymer dispersions stabilized using the subject invention silane-modified polyvinyl acetals, a considerable improvement in wet abrasion resistance in comparison with polymer dispersions which use conventional protective colloids can be achieved, since the silane-modified polyvinyl acetals also improve pigment binding, in both carbonate-rich and silicate-rich formulations.

The silane-modified polyvinyl acetals may also be used in water-based paints. A higher content of silane in the silane-modified polyvinyl acetals renders the latter capable of crosslinking, for example by moisture or by added catalyst, which opens up further application sectors, for example in powder paints. Other application sectors for the silane-modified polyvinyl acetals are their use as a binder in anti-corrosion compositions, where increased adhesion is a decided advantage. The modified polyvinyl acetals are also suitable as binders in the ceramics industry, specifically as binders for green ceramics. Mention should also be made of their use as binders for ceramic powders or metal powders in injection molding (powder injection molding), or as binders for the internal coating of containers. In all cases, the silane-modified polyvinyl acetals exhibit considerably better adhesion than the polyvinyl acetals known from the prior art.

The examples below provide further illustration of the invention but do not limit its scope in any way:

Preparation of Silanized Solid Resin

EXAMPLE 1

18.44 kg of methanol, 6.38 kg of vinyl acetate (VAc), 12.89 g of vinyltrimethoxysilane (Wacker XL10), and 28.77 g of PPV (tert-butyl perpivalate—75% by weight in aliphatic solvent; half-life of 1 h at 74° C.) were used as an initial charge in a 120 liter stirred vessel at atmospheric pressure, equipped with reflux condenser, metering equipment, and an anchor stirrer. The vessel was heated to 60° C. Once gentle reflux was achieved, the metering of initiator began (523 g of PPV+2.70 kg of methanol). Initiator was metered at 140 g/h for the first hour. After 1 hour of initial polymerization, vinyl acetate metering then began (32.29 kg of VAc with 65.23 g of vinyltrimethoxysilane), over a period 360 minutes; metering of initiator was simultaneously increased to 461 g/h. The total time for initiator metering was 410 minutes. After metering of initiator, the mixture was stirred for a further 120 minutes at the same temperature. After this post-reaction time, the vessel was heated for distillation, whereupon every 30 minutes fresh methanol was added to the vessel, this corresponding to the amount removed by distillation, for monomer removal.

Solid resin analyses: Solids content (SC): 70.91% (methanolic solution); pure solid resin: viscosity (Höppler, 10% by weight in ethyl acetate): 1.97 mPas; acid value (AV) (methanol) 3.37 mg KOH/g; residual vinyl acetate: 75 ppm; Mw (from GPC, eluent THF; polystyrene standards): 34,000 g/mol; Mn: 13,000 g/mol; polydispersity Mw/Mn: 2.6

EXAMPLE 2

18.38 kg of methanol, 6.36 kg of vinyl acetate (VAc), 38.95 g of vinyltriethoxysilane (Wacker GF 56), and 28.68 g of tert-butyl perpivalate (PPV) were used as an initial charge in a 120 liter stirred vessel at atmospheric pressure, equipped with reflux condenser, metering equipment, and an anchor stirrer. The vessel was heated to 60° C. Once gentle reflux was achieved, the metering of initiator began (521.4 g of PPV+2.69 kg of methanol). Initiator was metered at 140 g/h for the first hour. After 1 hour of initial polymerization, vinyl acetate metering then began (32.19 kg of VAc with 197.1 g of vinyltriethoxysilane), over a period of 360 minutes; metering of initiator was simultaneously increased to 461 g/h. The total time for initiator metering was 410 minutes. After metering of initiator, the mixture was stirred for a further 120 minutes at the same temperature. After this post-reaction time, the vessel was heated for distillation, whereupon every 30 minutes fresh methanol was added to the vessel, this corresponding to the amount removed by distillation.

Solid resin analyses: SC: 64.7% (methanolic solution); pure solid resin: viscosity (Höppler, 10% by weight in ethyl acetate): 1.45 mPas; AV (methanol) 3.93 mg KOH/g; residual vinyl acetate: 1200 ppm; Mw (from GPC, eluent THF; polystyrene standards): 20,600 g/mol; Mn: 8,900 g/mol; polydispersity Mw/Mn: 2.3

EXAMPLE 3

18.36 kg of methanol, 6.35 kg of vinyl acetate (VAc), 25.94 g of vinyltriethoxysilane (Wacker GF 56), 26.48 g of mercaptopropyltrimethoxysilane (Wacker GF 70) and 28.65 g of PPV were used as an initial charge in a 120 liter stirred vessel at atmospheric pressure, equipped with reflux condenser, metering equipment, and an anchor stirrer. The vessel was heated to about 60° C. Once gentle reflux was achieved, the metering of initiator began (520.8 g of PPV+2.69 kg of methanol). Initiator was metered at 140 g/h for the first hour. After 1 hour of initial polymerization, vinyl acetate metering then began (32.16 kg of VAc with 131.25 g of vinyltriethoxysilane, and 134.0 g of mercaptopropyl-trimethoxysilane), over a period of 360 minutes; metering of initiator was simultaneously increased to 461 g/h. The total time for initiator metering was 410 minutes. After metering of initiator, the mixture was stirred for a further 120 minutes at the same temperature. After this post-reaction time, the vessel was heated for distillation, whereupon every 30 minutes fresh methanol was added to the vessel, this corresponding to the amount removed by distillation.

Solid resin analyses: SC: 67.9% (methanolic solution); pure solid resin: viscosity (Höppler, 10% by weight in ethyl acetate): 1.80 mPas; AV (methanol) 7.29 mg KOH/g.

Comparative Example 1

The procedure was similar to that of Example 1, except that no silane was used as initial charge. 18.44 kg of methanol, 6.38 kg of vinyl acetate, and 28.77 g of PPV were used as an initial charge in a 120 liter stirred vessel at atmospheric pressure, equipped with reflux condenser, metering equipment, and an anchor stirrer. The vessel was heated to 60° C. Once gentle reflux was achieved, the metering of initiator began (523 g of PPV+2.70 kg of methanol). Initiator was metered at 140 g/h for the first hour. After 1 hour of initial polymerization, vinyl acetate metering then began (32.29 kg of VAc with 78.91 g of vinyltrimethoxysilane), over a period of 360 minutes; metering of initiator was simultaneously increased to 461 g/h. The total time for initiator metering was 410 minutes. After metering of initiator, the mixture was stirred for a further 120 minutes at the same temperature. After this post-reaction time, the vessel was heated for distillation, whereupon every 30 minutes fresh methanol was added to the vessel, this corresponding to the amount removed by distillation. In this example, therefore, all of the silane was metered in, with no silane present in the initial charge.

Solid Resin Analyses

SC: 69.0% (methanolic solution); pure solid resin: viscosity (Höppler, 10% by weight in ethyl acetate) 1.92 mPas; AV (methanol) 3.92 mg KOH/g; Mw (from GPC, eluent THF; polystyrene standards): 32,400 g/mol; Mn: 12,400 g/mol; polydispersity Mw/Mn: 2.6

Hydrolysis of Silanized Solid Resin

EXAMPLE 4

16 kg of a 70% by weight solution of the silanized solid resin from Example 3 was used as an initial charge in methanol in a 120 liter stirred vessel at atmospheric pressure equipped with reflux condenser, metering equipment, and an anchor stirrer, and diluted with methanol to a solids content of 30% by weight. This solution was then heated to 55° C. 120 ml of 45% by weight methanolic sodium hydroxide solution were then rapidly added. 2 hours after the gel point, a pH of 7 was established by adding concentrated acetic acid. In order to obtain the precipitated silane-containing polyvinyl alcohol (PVAL) in the form of an aqueous solution, the suspension was heated for distillation, and the distillate was successively replaced by water. This procedure was repeated until all of the methanol had been replaced by water.

Aqueous PVAL solution; analyses: SC: 20.5%; AV: 1.12 mg KOH/g; pH (4% by weight in water): 5.8; saponification value (SV): 42.2 mg KOH/g; viscosity (Höppler, 4% by weight in water, DIN 53015): 2.92 mPas

EXAMPLE 5

16 kg of a 70% by weight solution of a copolymer composed of 99.5% by weight of vinyl acetate and 0.5% by weight of vinyltriethoxysilane prepared in a manner similar to that of Example 1, in methanol were used as an initial charge and diluted with methanol to a solids content of 30%. This solution was then heated to 35° C. 88 ml of 45% by weight methanolic sodium hydroxide solution were then rapidly added. 10 min after the gel point, a pH of 7 was established by adding concentrated acetic acid. In order to obtain the precipitated silane-containing PVAL in the form of an aqueous solution, the suspension was heated for distillation, and the distillate was replaced by water. This procedure was repeated until all of the methanol had been replaced by water.

Aqueous PVAL solution; analyses: SC: 19.46%; AV: 2.24 mg KOH/g; pH (4% by weight in water): 5.6; SV: 135.6 mg KOH/g; viscosity (Höppler, 4% by weight in water, DIN 53015): 4.07 mPas.

Acetalization of Hydrolyzed, silane-containing Vinyl Acetate Copolymer

EXAMPLE 6

2788 ml of distilled water, 826 ml of 20% by weight HCl, and 1172 ml of a 23.1% by weight aqueous solution of a polyvinyl alcohol, SV 9.7 mg KOH/g, viscosity 2.26 mPas (DIN 53015; Höppler method; 4% by weight aqueous solution), prepared by hydrolyzing a silane-containing PVAc solid resin with 0.2% by weight of vinyltrimethoxysilane based on total polymer weight and prepared as in Example 1, were used as an initial charge in a 6 liter glass reactor. The initial charge was cooled to +5° C. within 1 hour, with stirring. 100 ml of acetaldehyde, precooled to –4° C., were then added within a period of 5 minutes. The internal temperature of the reactor rose to +7° C. during this process. The temperature was reduced to +5° C. within a very short period, and the mixture was stirred for 20 minutes at this temperature. 128 ml of butyraldehyde, precooled to –4° C., were then added within the same period of 5 minutes. The internal temperature rose briefly to 6.5° C. during this process. Five to seven minutes after addition of the butyraldehyde, the mixture, initially clear, became milky, and the product precipitated no more than 10 minutes later. After 40 minutes of reaction time at +5° C., the temperature was increased to 25° C. over a period of 3.5 hours, and this temperature was maintained for a further 2 hours. The product was then filtered off with suction and washed with distilled water until the reaction of the filtrate was neutral. This was followed by drying to a solids content of at least 98%, initially at 22° C., then in vacuo at 35° C. This gave a silane-modified polyvinyl butyral having 13.4% by weight of vinyl alcohol units. The vinyl acetate content was 1.1% by weight. The viscosity (DIN 53015; Höppler method; 10% by weight ethanolic solution) was 17.4 mPas. Silicon content: 0.06% by weight. The silane-modified polyvinyl acetal had a Tg of 87° C., and its 10% by weight ethanolic solution comprised a single phase and was transparent.

Comparative Example 2

The procedure was similar to that of Example 6, with the exception that instead of the silanized solid resin from Example 1 use was made of the product from Comparative Example 1. This gave a silane-modified polyvinyl butyral having 12.6% by weight of vinyl alcohol units. The vinyl acetate content was 1.0% by weight. A 10% by weight solution of this polyvinyl acetal in ethanol comprised two phases and had a high level of gelling, many gel particles similar in appearance to sand, one phase (upper) being noticeably cloudy, and the other phase (lower) being entirely opaque! The viscosity (DIN 53015; Höppler method; 10% by weight ethanolic solution) could not therefore be determined. The polyvinyl acetal had a Tg of 87.5° C. Silicon content: 0.06% by weight.

EXAMPLE 7

2630 ml of distilled water, 1114 ml of 20% by weight HCl, and 1212 ml of a 19.3% by weight aqueous solution of a polyvinyl alcohol, SV 77.3 mg KOH/g, viscosity 2.13 mPas (DIN 53015; Höppler method; 4% by weight aqueous solution), prepared by hydrolyzing a silane-containing PVAc solid resin with 0.6% by weight of vinyltriethoxysilane based on total polymer weight prepared as in Example 2, were used as an initial charge in a 6 liter glass reactor. The initial charge was cooled to –2° C. within 1 hour, with stirring, and 190 ml of butyraldehyde, precooled to –4° C., were then added within a period of 5 minutes. The internal temperature of the reactor rose to –0.5° C. during this process. The temperature was reduced to –2° C. within a very short period. Three minutes after addition of the butyraldehyde, the mixture, initially clear, became milky, and the product precipitated no more than 5 minutes later. After 40 minutes of reaction time at –2° C., the temperature was increased to 25° C. over a period of 3.5 hours, and this temperature was maintained for a further 2 hours. The product was then filtered off with suction and washed with distilled water until the reaction of the filtrate was neutral. This was followed by drying to a solids content of at least 98% by weight, initially at 22° C., then in vacuo at 35° C.

This gave a silane-modified polyvinyl butyral having 15.9% by weight of vinyl alcohol units. The vinyl acetate content was 6.0% by weight. The viscosity (DIN 53015; Höppler method; 10% by weight ethanolic solution) was 12.2 mPas. Silicon content was determined as 0.10% by weight.

EXAMPLE 8

The procedure was similar to that of Example 7, except that use was made of a carboxy-functional, silanized polyvinyl alcohol.

The polyvinyl alcohol was prepared by hydrolysis in a manner similar to that of Example 4, from a PVAc solid resin containing silane groups and carboxy groups, having 0.6% by weight of vinyltriethoxysilane and 0.2% by weight of acrylic acid (based on total polymer weight). The synthesis used a method similar to that of Example 1, i.e. in each case 16% by weight of the silane, the acrylic acid, and the vinyl acetate were used as an initial charge and the remaining portion of the silane and that of the acrylic acid were in each case metered in with the remaining vinyl acetate. The ratio between the silane and the acrylic acid and vinyl acetate remained constant throughout the polymerization. The result was a homogeneous copolymer.

This gave a modified polyvinyl butyral having 15.4% by weight of vinyl alcohol units. The vinyl acetate content was 5.9% by weight. The viscosity (DIN 53015; Höppler method; 10% by weight ethanolic solution) was 25.2 mPas. The Si content was determined as 0.10% by weight.

EXAMPLE 9

2600 ml of distilled water, 1114 ml of 20% by weight HCl, and 1267 ml of an 18.5% by weight aqueous solution of a polyvinyl alcohol prepared as in Example 5, SV 135.6 mg KOH/g, viscosity 4.07 mPas DIN 53015; Höppler method; 4% by weight aqueous solution, prepared by hydrolyzing a silane-containing PVAc solid resin having 0.5% by weight of vinyltriethoxysilane based on total polymer weight were used as an initial charge in a 6 liter glass reactor. The initial charge was cooled within one hour to 0° C., with stirring, and then 190 ml of butyraldehyde, precooled to −4° C., were added within a period of 5 minutes. The internal temperature in the reactor rose to 1.1° C. during this process. The reactor was cooled again to 0° C. within a very short period. About 3 minutes after addition of the butyraldehyde, the mixture, which until then was clear, became cloudy, and the product precipitated as little as 5 minutes later. After 40 minutes of reaction time at 0° C., the temperature was increased to 25° C. over a period of 3.5 hours, and this temperature was maintained for a further 2 hours. The product was then filtered off with suction, and washed with distilled water until the reaction of the filtrate was neutral. This was followed by drying to a solids content of at least 98%, initially at 22° C., then in vacuo at 35° C.

This gave a modified polyvinyl butyral having 12.9% by weight of vinyl alcohol units. The polymer had a vinyl acetate content of 10.75% by weight. The viscosity (DIN 53015; Höppler method; 10% by weight ethanolic solution) was 181.4 mPas.

EXAMPLE 10

The procedure was similar to that of Example 8, except that the polyvinyl alcohol used for the acetalization, prepared as in Example 4, SV 42.2 mg KOH/g, viscosity 2.92 mPas (DIN 53015; Höppler method; 4% by weight aqueous solution), prepared by hydrolyzing a silane-containing PVAc solid resin having 0.4% by weight of mercaptopropyltrimethoxysilane and 0.4% by weight of vinyltriethoxysilane based on total polymer weight, prepared as in Example 3, was stored for a prolonged period at 10° C. and therefore was in partially associated condition prior to the acetalization.

This gave a silane-modified polyvinyl butyral having 15.71% by weight of vinyl alcohol units. The viscosity (DIN 53015; Höppler method; 10% by weight ethanolic solution) was 24.9 mPas. Silicon content: 0.20% by weight.

Comparative Example 3

The procedure was similar to that of Example 8, except that the polyvinyl alcohol used in the amounts stated as an initial charge for the acetalization was a 20% by weight aqueous solution of a fully hydrolyzed vinyl acetate homopolymer having a residual content of 2% by weight of vinyl acetate units and a viscosity (DIN 53015; Höppler method; 4% by weight aqueous solution) of 3.0 mPas. The acetalization was carried out using 100 ml of acetaldehyde and 128 ml of butyraldehyde.

This gave a polyvinyl butyral having 15.8% by weight of vinyl alcohol units. The viscosity (DIN 53015; Höppler method; 10% by weight ethanolic solution) was 25.8 mPas.

Comparative Example 4

The procedure was similar to that of Example 7, except that the polyvinyl alcohol used as an initial charge for the acetalization was a 20% by weight aqueous solution of a fully hydrolyzed vinyl acetate homopolymer having a residual content of 2% by weight of vinyl acetate units and a viscosity (DIN 53015; Höppler method; 4% by weight aqueous solution) of 2.11 mPas.

This gave a polyvinyl butyral having 16.5% by weight of vinyl alcohol units, 2.0% by weight of vinyl acetate units. The viscosity (DIN 53015; Höppler method; 10% by weight ethanolic solution) was 13.24 mPas.

EXAMPLE 11

Use of a Silane-modified Polyvinyl Acetal as Protective Colloid 2.16 kg of water, 150.4 g of Genapol X 150 (40% by weight aqueous solution), 6.92 g of sodium acetate (100% purity), 139.45 g of Mersolat (30.9% by weight aqueous solution), 60.16 g of sodium vinylsulfonate (25% by weight), and 752 g of vinyl acetate were used as an initial charge in a 19 liter pressure autoclave. 10% by weight formic acid was used to adjust the pH to 5. 10 ml of Trilon B (EDTA; 2% by weight aqueous solution) and 31 ml of ammonium iron sulfate (1% by weight solution) were also added. The vessel was heated to 70° C., and ethylene was introduced at 22 bar. As soon as thermal equilibrium of the reactor had been achieved, a 5.4% by weight ammonium persulfate solution (APS solution) was run in at 70 g per hour, and a 4.16% by weight sodium sulfite solution at 85 g per hour. Beginning about 25 minutes later, 6.77 kg of vinyl acetate were metered in at a rate of 1048 g per hour (monomer metering). At the same time, emulsifier was metered in at a metering rate of 602 g per hour. The emulsifier added comprised 2.13 kg of water, 778.34 g of Genapol X 150 (40% by weight aqueous solution), and 22.56 g of sodium acetate.

The protective colloid used comprised 977.63 g of a 10% by weight aqueous solution of a silane-containing, water-soluble polyvinyl acetal partially acetalized with butyraldehyde (degree of acetalization 10.2 mol %), obtained by hydrolyzing a silane-containing, water-soluble polyvinyl acetal partially acetalized with butyraldehyde (degree of acetalization 10.2 mol %), obtained by hydrolyzing a silane-containing (polyvinyl acetate) solid resin composed of 99.4% by weight of vinyl acetate and 0.6% by weight of vinyltrimethoxysilane (degree of hydrolysis 98.3 mol %), prepared by a method similar to that of Examples 1 and 4. A 4% by weight aqueous solution of the polyvinyl acetal used had a viscosity (DIN 53015; Höppler method) of 4.35 mPas. The total metering time for the two additions amounted to 6.5 hours. About 15 min after the start of the reaction, the APS metering rate was reduced to 43.3 g per hour, and the Na sulfite metering rate was reduced to 52.7 g per hour. 30 minutes after the end of the metering of the vinyl acetate and the emulsifier, a "GMA addition" was metered in, the formulation of the "GMA additive" being 150.4 g of water, 11.28 g of Genapol X 150, and 60.16 g of glycidyl methacrylate (GMA). The metering time was 30 minutes (rate: 444 g per hour). After the end of the "GMA addition", the metering of APS and Na sulfite was continued for a further hour. After depressurization, the dispersion was stripped with steam to minimize residual monomers and then treated with Hydorol W preservative.

Dispersion analyses: Solids content: 53.2%, pH: 5.6; Brookfield viscosity 20 (spindle 1): 214 mPas; MFT: 1° C.; K value: 85.2; ethylene content: 6.9%; density: 1.07 g/ml; screening residue, 60 µm screen: 54 ppm Comparative Example 5

(Preparation of a dispersion using non-silane-modified, partially acetalized polyvinyl butyral): The procedure was similar to that of Example 11, except that the protective colloid present in the emulsifier addition, instead of the partially acetalized silane-containing polyvinyl butyral, was the same amount of partially acetalized polyvinyl butyral (degree of acetalization: 10.3 mol %) with no silanol groups and with a viscosity in 4% by weight aqueous solution (DIN 53015; Höppler method) of 4.51 mPas.

Dispersion analysis: Solids content: 54.1%, pH: 5.2; Brookfield viscosity 20 (spindle 1): 234 mPas; MFT: 1° C.; ethylene content: 6.2%; density: 1.08 g/ml; screening residue, 60 µm screen: 30 ppm Test Methods 1. Determination of dynamic viscosity of a solution of polyvinyl acetals (solution viscosity): 90.00±0.1 g of ethanol and 10.00±0.01 g of polyvinyl acetal were weighed into a 250 ml Erlenmeyer flask with ground glass stopper, and a shaker was used at 50° C. to give complete dissolution, this being followed by cooling to 20° C. and determination of dynamic viscosity (DIN 53 015; Höppler method) at 20° C. using a suitable ball, e.g. ball 3.

2. Determination of vinyl alcohol content: The content of vinyl alcohol groups in the polyvinyl acetals was determined by acetylating the hydroxy groups with acetic anhydride in the presence of pyridine and 4-dimethylaminopyridine. For this, 1 g±0.001 g of polyvinyl acetal was dissolved in 24 ml of pyridine, and 0.04 g of 4-dimethylaminopyridine at 50° C. within a period of 2 hours. The solution, cooled to 25° C., was treated with 10 ml of a mixture made from pyridine and acetic anhydride (87/13 parts by volume), and intimately mixed for a period of 1 hour. 30 ml of a mixture made from pyridine/water (5/1 parts by volume) were then added, and the reaction mixture was shaken for a further hour. This was followed by titration to pH 7, using methanolic 0.5 N KOH.

Calculation: percent by weight of vinyl alcohol (=[(100× $M_w$)/2000]×(ml blind value−ml specimen), where $M_w$=average molecular weight per repeat unit in the polymer.

3. Determination of viscosity of polyvinyl alcohol solutions: The method for determining viscosity of the partially or fully hydrolyzed silanized solid resins used as starting materials was based on the determination of dynamic viscosity of the polyvinyl acetals; the aqueous solutions used were of 4% by weight.

4. Determination of adhesion:
  a) Tesa test: A blister-free film is cast from the specimen to be tested (e.g. polyvinyl acetal) on a film, in some cases cleaned in advance using isopropanol and, where appropriate, corona-pretreated, and dried. For film casting, the polyvinyl acetal is dissolved in ethanol, the concentration in each case depending on the viscosity of the solution. Beiersdorf AG Tesa 4105 film of width 15 mm is used for the test. T0 test bond by weight, a strip of 13 cm length is applied by adhesion to the dried film which has been stored at room temperature for at least 16 h. Firm and uniform pressure from a fingernail is used to secure the applied section, while pulling one end of the Tesa film to obtain a lug for peeling. The film to be tested is positioned on a hard underlay for this process. The lug is now used to peel off the Tesa film backward at an angle of 45°. The test consists in observing the area under investigation to find whether and to what extent the film has adhered to the Tesa film and become released from the print material. The test is carried out in a number of areas, under identical conditions. The results are graded 1 to 4, 1 being the best grade and 4 the worst.

Detailed Assessment

1=very good adhesion (no areas of release)

2=release of coating in isolated areas

3=release of coating in a number of areas

4=coating does not adhere (full release)

b) Determination of bond by weight in the composite: The adhesion of a paint or of a printing ink to the underlying material can be expressed numerically by using an instrument to measure the bond by weight in the laminate. For this test, each slab of film was laminated to itself. If the film were corona-pretreated prior to application of the paint, the laminate films were subjected to the same pretreatment. The laminates were produced using a laminating roll with a weight of 5 kg, and the adhesive used was a 2c PU system (Liofol UK 3640, hardener UK 6800) from Henkel. This system is suitable for producing composite films from PE, PP, PET, PA and unplasticized PVC. To prepare a ready-for-use adhesive, the first adhesive component is diluted to 35% and then mixed in a ratio of 50:1 with the hardener. This adhesive is applied to the film, dried at room temperature for 30 s, and laminated to the coated side (coating as in Tesa test) of another film, by passing the roller six times over the composite without exerting pressure. The adhesive is cured for 24 h at a temperature of 60° C. The composite is cut into strips of width 15 mm, and bond by weight is measured using an Instron tensile tester. The higher the value measured, the better the adhesion in the composite. If adhesion in the composite is very good, tearing of the film can even occur. In that case, no quantitative value is given.

5. Determination of wet abrasion resistance for dispersions:

Using the dispersions from Example 13 and Comparative Example 5, paints were prepared with a silicate-rich mixing specification 1 (silicate/carbonate=180/43 parts by weight) and with a carbonate-rich mixing specification 2 (carbonate/silicate=260/80 parts by weight), as presented in Tables 1 and 2 respectively. Using the silicate-rich paint mixing specification 1 and the carbonate-rich paint mixing specification 2, wet abrasion resistance was tested by the non-woven method (ISO 11998). For this, the ablation of the coating was determined via the weight loss from the paint film after 28 days (28 d). The paint ablation in µm was then calculated from the density of the paint, the areas abraded and the weight loss from the paint film.

TABLE 1

Paint mixing specification 1 (silicate-rich):

| | |
|---|---|
| Water | 300 |
| Cellulose ether (Tylose H 6000 YP) | 6 |
| Dispersant (Dispex N 40) | 5 |
| Dispersant (Calgon N) | 5 |
| Sodium hydroxide (10% by weight) | 1 |
| Preservative (Hydorol W) | 1 |
| Antifoam (Agitan 260) | 4 |
| Magnesium silicate (Talc N) | 30 |
| Titanium dioxide pigment (Kronos 2300) | 250 |
| Aluminum silicate, precipitated (P 820) | 50 |
| Aluminum silicate (china clay B) | 100 |
| Calcium carbonate, precipitated (Socal P2) | 13 |
| Dolomite (Microdol 1) | 30 |
| Polymer dispersion (53%) | 200 |
| Antifoam (Agitan 260) | 5 |
| Total of parts by weight | 1000 |

TABLE 2

Paint mixing specification 2 (carbonate-rich):

| | |
|---|---|
| Water | 423 |
| Cellulose ether (Tylose H6000 YP) | 6 |
| Dispersant (Dispex N 40) | 5 |
| Dispersant (Calgon N) | 5 |
| Sodium hydroxide (10% by weight) | 1 |
| Preservative (Hydorol W) | 1 |
| Antifoam (Agitan 260) | 4 |
| Magnesium silicate (Talc N) | 80 |
| Titanium dioxide pigment (Kronos 2300) | 100 |
| Calcium carbonate (Omyacarb 2 GU) | 70 |
| Calcium carbonate (Omyacarb 5 GU) | 70 |
| Calcium carbonate, precipitated (Socal P2) | 70 |
| Dolomite (Microdol 1) | 50 |
| Polymer dispersion (53%) | 110 |
| Antifoam (Agitan 260) | 5 |
| Total of parts by weight | 1000 |

Performance Results

The following commercially available films were used to test adhesion by the Tesa test and to determine bond by weight:

DuPont PET Melinex 800; corona pretreatment using 400 W
DuPont PET Melinex 813; untreated
OPP Mobil MB 400; untreated; (polypropylene film)
OPP Mobil MB 400; corona pretreatment using 600 W (polypropylene film)

Results of Measurements for Adhesion of Products from Examples and Comparative Examples (Table 3)

TABLE 3

Tesa test evaluation

| Ex. | PET 800, corona-t. | PET 813, untreated | Mobil MB400, untreated | Mobil MB400, corona-t. |
|---|---|---|---|---|
| 6 | 1 | 1 | 2 | 2 |
| 7 | 1 | 1 | 1 | 1 |
| 8 | 1 | 1 | 1 | 1 |
| 9 | 1 | 1 | 2 | 2 |
| C3 | 1 | 1 | 4 | 4 |
| C4 | 1 | 1 | 4 | 4 |

Using the silane-modified polyvinyl acetals, a marked improvement in adhesion is obtained in the Tesa test, especially with the polypropylene films (OPP Mobil MB 400, treated and untreated). This is confirmed by comparing Examples 7 and 9 with Comparative Example 4 and comparing Examples 6 and 8 with Comparative Example 3. Better adhesion for the silane-containing polyvinyl acetals in the Tesa test occurs even at relatively low content of silicon (or alkoxysilane groups and/or free silanol groups), as is illustrated by Example 6.

In the case of DuPont PET Melinex polyester films, the Tesa test is not conclusive, since here the comparative samples (standard products) also show very good adhesion throughout these tests.

The differences become more marked when bond by weight is determined, and this can be seen in Table 4.

TABLE 4

Bond by weight determination; unit: N/15 mm

| Ex. | PET 800 corona | PET 813 untreated | OPP MB400 untreated | OPP MB400 corona |
|---|---|---|---|---|
| 6 | 0.27 tF | F | 0.55 | 0.89 |
| 7 | 0.22 tF | 0.26 tF | 0.37 | 0.62 |
| 8 | 0.37 tF | F | 0.65 | 0.99 tF |
| 9 | 0.31 tF | F | F | F |
| C3 | 0.03 | 0.09 | 0.02 | 0.01 |
| C4 | 0.015 | 0.13 | 0.005 | 0.01 |

F = film tears, tF = some tearing of film

Bond by weight was drastically increased using the silane-containing polyvinyl acetals of the invention. Comparison of Example 6 or Example 8 with Comparative Example 3 shows that the increase in bond by weight for polyester films (DuPont PET Melinex 800 and 813) is so great that the film tears completely or to some extent. This is also confirmed by comparing Examples 7 and 9 with Comparative Example 4. Here, therefore, the adhesion of the polyvinyl acetal of the invention to the substrate is actually stronger than the cohesion of the film used.

In the case of the OPP Mobil MB 400 polypropylene films (treated and untreated), use of the polyvinyl acetals of the invention improves adhesion by some orders of magnitude in comparison with the standard grades. This is shown by comparing Example 6 or Example 8 with Comparative Example 3, and comparing Example 7 with Comparative Example 4.

The silane-containing polyvinyl acetals, obtained from partially hydrolyzed polyvinyl alcohols, exhibit excellent adhesion, which is seen in tearing of the film, especially in the case of the OPP Mobil MB 400 polypropylene films (treated and untreated). This is apparent from a comparison of Example 9 with Comparative Example 4. Example 8 shows that the adhesion within the composite is further improved if the polyvinyl acetal also contains carboxy groups, besides the silane functions.

Performance testing of the dispersions comprising the silane-containing polyvinyl acetal of the invention as protective colloid (Table 5):

TABLE 5

| Example | Abrasion (28d, μm) ink mixing specification 1 | Abrasion (28d, μm) ink mixing specification 2 |
|---|---|---|
| 11 | 21.2 | 52.9 |
| C5 | 27.8 | 56.7 |

In both ink mixing specifications, use of the partially acetalized silane-containing polyvinyl acetal of the invention leads to an improvement in the wet abrasion resistance, particularly in the case of dispersions which comprise glycidyl methacrylate. Use of a dispersion with a conventional partially acetalized polyvinyl butyral with similar viscosity leads, in contrast, to poorer results. This is shown by comparing Example 13 with Comparative Example 5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" have their customary meaning of "one or more" unless indicated otherwise.

What is claimed is:

1. A silane-modified polyvinyl acetal, prepared by copolymerizing a) a comonomer mixture comprising at least one vinyl ester of an optionally branched alkylcarboxylic acid having from 1 to 15 carbon atoms, and optionally, one or more comonomers comprising (meth)acrylate(s) of alcohols having from 1 to 15 carbon atoms, olefms, dienes, vinylaromatics, or vinyl halides, with b) from 0.02 to 20.0% by weight of one or more of ethylenically unsaturated, hydrolyzable silicon compounds or hydrolyzable mercaptosilanes, to form a vinyl ester copolymer, wherein the silane compounds b) comprise ethylenically unsaturated silicon compounds of the formula $R^1SiR_a(OR^2)_b$, where R is a $C_1$–$C_3$-alkyl radical, a $C_1$–$C_3$-alkoxy radical, or halogen, $R^1$ is $CH_2=CR^3-(CH_2)_{0-1}$ or $CH_2=CR^3CO_2(CH_2)_{1-3}$, $R^2$ is an optionally branched, optionally substituted alkyl radical having from 1 to 12 carbon atoms, or an acyl radical having from 2 to 12 carbon atoms, where the carbon atoms of $R^2$ may be interrupted by an ether group, $R^3$ is H or $CH_3$, a is an integer from 0 to 2, b is an integer from 1 to 3, and the sum of a and b is 3, and wherein the hydrolyzable mercaptans comprise mercaptosilanes of the formula HS—$(CR^4_2)_{1-3}$—$SiR^5_3$, where $R^4$ are identical or different and are H or a $C_1$–$C_6$-alkyl group, $R^5$ are identical or different and are a $C_1$–$C_6$-alkyl group or a $C_1$–$C_6$-alkoxy group, and at least one of the radicals $R^5$ is an alkoxy group;

hydrolyzing the vinyl ester copolymer to contain 50 mol % or more of vinyl alcohol units; and acetalizing the vinyl alcohol units with one or more aliphatic or aromatic aldehydes having from 1 to 15 carbon atoms, wherein from 5 to 50% by weight of a mixture of comonomers a) and silane comonomers b), based on the total weight of the comonomers a) and b), is used as an initial charge, and the remainder of said mixture is metered in during the polymerization, such that the ratio between the comonomers a) and the silane comonomers b) remains constant throughout the polymerization.

2. The silane-modified polyvinyl acetal of claim 1, wherein acetalization proceeds to a degree of acetalization of from 1 to 80 mol %.

3. The silane-modified polyvinyl acetal of claim 1, wherein the viscosity of the silane-modified polyvinyl acetals measured in accordance with DIN 53015; Höppler method, 10% by weight solution in ethanol, is from 4 to 1200 mPas.

4. The silane-modified polyvinyl acetal of claim 1, wherein the comonomers a) copolymerized further comprise from 0.02 to 20% by weight, based on the total weight of the comonomers a) and b), of additional comonomers comprising one or more of ethylenically unsaturated mono- and dicarboxylic acids, ethylenically unsaturated carboxamides, ethylenically unsaturated carbonitriles, mono- and diesters of fumaric acid or maleic acid, ethylenically unsaturated sulfonic acids and/or their salts, or ethylenically polyunsaturated comonomers; and/or post-crosslinking comonomers comprising one or more of acrylamidoglycolic acid, methyl methylacrylamidoglycolate, N-methylolacrylamide, N-methylolinethacrylamide, allyl N-methylolcarbarnate, or alkyl ethers or esters of N-methylolacrylamide, of N-methylolmethacrylamide, or of allyl N-metholcarbamate.

5. The silane-modified polyvinyl acetal of claim 1, wherein the silane compounds copolymerized comprise from 0.05 to 3% by weight, based on the total weight of the comonomers a) and b), of one or more silane compounds selected from the group consisting of vinyltrimethoxysilane, vinyldimethoxymethylsilane, vinylmethoxydimethylsilane, vinyltriethoxysilane, vinyldiethoxymethylsilane, vinylethoxydimethylsilane vinyltris(1-methoxyisopropoxy) silane methacryloxypropyltris(2methoxyethoxy)silane, 3-mercaptopropyltrimethoxysilane, 3-mercaptopropyldimethoxymethylsilane 3-mercaptopropyhmethoxydimethylsilane, 3-methacryloxypropyltrimethoxysilane 3-methylacryl-oxypropylmethyldimethoxysilane and methacryloxymethyltrimethoxysilane.

6. The silane-modified polyvinyl acetal of claim 1, wherein the hydrolysis is carried out to provide from 70 to 99 mol % of vinyl alcohol units.

7. The silane-modified polyvinyl acetal of claim 1, wherein acetalization employs one or more aldehydes selected from the group consisting of formaldehyde, acetaldehyde, propionaldehyde, and butyraldehyde.

8. A process for preparing the silane-modified polyvinyl acetals of claim 1, comprising copolymerizing:
a) a comonomer mixture comprising at least one vinyl ester of optionally branched alkylcarboxylic acids having from 1 to 15 carbon atoms, and optionally, one or more comonomers comprising (meth)acrylate(s) of alcohols having from 1 to 15 carbon atoms, olefins, dienes, vinylaromatics, or vinyl halides, with b) from 0.02 to 20.0% by weight of one or more of ethylenically unsaturated, hydrolyzable silicon compounds or hydrolyzable mercaptosilanes to form a vinyl ester copolymer, wherein the silane compounds b) comprise ethylenically unsaturated silicon compounds of the formula $R^1SiR_a(OR^2)_b$, where R is a alkyl radical, a $C_1$–$C_3$-alkoxy radical, or halogen, $R^1$ is $CH_2=CR^3-(CH_2)_{0-1}$ or $CH_2=CR^3CO_2(CH_2)_{1-3}$, $R^2$ is an optionally branched, optionally substituted alkyl radical having from 1 to 12 carbon atoms, or an acyl radical having from 2 to 12 carbon atoms, where the carbon atoms of $R^2$ may be interrupted by an ether group, $R^3$ is H or $CH_3$, a is an integer from 0 to 2, b is an integer from 1 to 3, and the sum of a and b is 3, and wherein the hydrolyzable mercaptans comprise mercaptosilanes of the formula HS—$(CR^4_2)_{1-3}$—$SiR^5_3$, where $R^4$ are identical or different and are H or a $C_1$–$C_6$-alkyl group, $R^5$ are identical or different and are a $C_1$–$C_6$-alkyl group or a $C_1$–$C_6$-alkoxy group, and at least one of the radicals $R^5$ is an alkoxy group;

hydrolyzing the vinyl ester copolymer to contain 50 mol % or more of vinyl alcohol units; and acetalizing the vinyl alcohol units with one or more aliphatic or aromatic aldehydes having from 1 to 15 carbon atoms, wherein from 5 to 50% by weight of a mixture of comonomers a) and silane comonomers b), based on the total weight of the comonomers a) and b), is used as an initial charge, and the remainder of said mixture is metered in during the polymerization, so that the ratio between the comonomers a) and the silane comonomers b) remains constant throughout the polymerization.

* * * * *

UNITED STATES PATENT AND TRADEMARK OFFICE
CERTIFICATE OF CORRECTION

PATENT NO. : 6,794,477 B2
DATED : September 21, 2004
INVENTOR(S) : Kurt Stark et al.

It is certified that error appears in the above-identified patent and that said Letters Patent is hereby corrected as shown below:

Column 19,
Line 17, delete "olefms" and insert -- olefins --.

Column 20,
Line 13, after "silane" (first occurrence) insert -- , -- (comma).
Line 38, after "where R is a" insert -- $C_1 - C_3$- --.

Signed and Sealed this

Nineteenth Day of April, 2005

JON W. DUDAS
*Director of the United States Patent and Trademark Office*